United States Patent
Vigren

(10) Patent No.: US 8,708,431 B2
(45) Date of Patent: Apr. 29, 2014

(54) ARRANGEMENT FOR CONTROLLING A TRACK TENSION WHEEL OF TRACKED VEHICLE

(75) Inventor: Mats Vigren, Docksta (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 408 days.

(21) Appl. No.: 13/139,712

(22) PCT Filed: Dec. 4, 2009

(86) PCT No.: PCT/SE2009/051377
§ 371 (c)(1),
(2), (4) Date: Sep. 6, 2011

(87) PCT Pub. No.: WO2010/071552
PCT Pub. Date: Jun. 24, 2010

(65) Prior Publication Data
US 2011/0309673 A1 Dec. 22, 2011

(30) Foreign Application Priority Data

Dec. 16, 2008 (SE) ...................................... 0802581

(51) Int. Cl.
*B62D 55/30* (2006.01)

(52) U.S. Cl.
USPC .......................................... 305/145; 305/143

(58) Field of Classification Search
USPC ......... 305/143, 144, 145, 146, 147, 148, 150, 305/153, 154, 155
See application file for complete search history.

(56) References Cited

U.S. PATENT DOCUMENTS 4,949,800 A * 8/1990 Virly ............................. 180/9.21
7,093,914 B2 * 8/2006 Eriksson et al. .............. 305/143

FOREIGN PATENT DOCUMENTS

| EP | 0680869 A2 | 11/1995 |
|---|---|---|
| EP | 1114766 A2 | 7/2001 |

(Continued)

OTHER PUBLICATIONS

International Preliminary Report on Patentability received for PCT Patent Application No. PCT/SE2009/051377, mailed on Jun. 30, 2011, 6 pages.

(Continued)

*Primary Examiner* — Kip T Kotter
*Assistant Examiner* — Jean Charleston
(74) *Attorney, Agent, or Firm* — Morrison & Foerster LLP

(57) ABSTRACT

Arrangement for controlling a track tension wheel of a tracked vehicle, comprising a guide arm system (12), which is swivel-mounted in a part fixed to the vehicle and which carries a wheel axle journal (29) for rotatably supporting the track tension wheel, in such a way that this can be swiveled by means of a first drive element (34) between a raised position and a lowered position, and a second drive element (36) for varying the center-to-center distance between the center axis of the track tension wheel and the swivel axis of the guide arm system in the part fixed to the vehicle. The guide arm system (12) comprises a first guide arm (14), which is swivel-mounted in the part fixed to the vehicle and which via a joint pin (18) pivotally supports a two-armed lever (16), a second guide arm (20), which is swivel-mounted in the part fixed to the vehicle and is pivotally connected to a linearly displaceable part (34b) of the first drive element (34), and a third guide arm (24), which is pivotally connected to the second guide arm (20) and is pivotally connected to the two-armed lever. One end of the lever (16) carries the wheel axle journal (29), while a linearly displaceable part (36b) of the second drive element (36) is effectively connected to the two-armed lever (16) carrying the wheel axle journal (29).

16 Claims, 5 Drawing Sheets

(56) References Cited

FOREIGN PATENT DOCUMENTS

| | | |
|---|---|---|
| EP | 1466816 A2 | 10/2004 |
| EP | 1818244 A2 | 8/2007 |
| SE | 525073 C2 | 11/2004 |
| SE | 529600 C2 | 10/2007 |
| WO | 99/17978 A1 | 4/1999 |

OTHER PUBLICATIONS

International Search Report and Written Opinion received for PCT Patent Application No. PCT/SE2009/051377, mailed on Mar. 17, 2010, 9 pages.

* cited by examiner

ARRANGEMENT FOR CONTROLLING A TRACK TENSION WHEEL OF TRACKED VEHICLE

CROSS REFERENCE TO RELATED APPLICATIONS

This is a U.S. National Phase patent application of PCT/SE2009/051377, filed Dec. 4, 2009, which claims priority to Swedish Patent Application No. 0802581-9, filed Dec. 16, 2008, each of which is hereby incorporated by reference in the present disclosure in its entirety.

TECHNICAL FIELD

The invention relates to devices for controlling a track tension wheel of a tracked vehicle, and relates more specifically to an arrangement of the type which comprises a guide arm system, which at an inner part thereof is swivel-mounted in a part fixed to the vehicle and which on an outer part carries a wheel axle journal for rotatably supporting a hub of the track tension wheel, in such a way that this can be swivelled by means of a first drive element between a raised position and a lowered position, and a second drive element for varying the centre-to-centre distance between the centre axis of the track tension wheel and the swivel axis of the guide arm system in the part fixed to the vehicle, in order to bring about an adjustment of the tension in a drive track of the vehicle bearing against the tension wheel, or to allow changing of the drive track.

In order to adjust and to optimize the running characteristics of a track vehicle according to the surface on which it is being driven, it has previously been proposed to vary the height of the tension wheel of the tracked vehicle between an upper position, when the vehicle is being driven on a hard, load-bearing surface, and a lowered position, when the vehicle is being driven on a soft surface, with poor load-bearing capacity, such as soft snow, wet arable land or boggy ground. At the same time it is desirable to keep the track tension somewhat lower when the tension wheel is raised, in order to reduce track wear when driving on hard surfaces, or to keep the track tension somewhat higher when the tension wheel is lowered, in order to reduce the specific ground pressure when driving on soft surfaces.

BACKGROUND ART

An arrangement largely of the type referred to in the introductory part which will allow this has previously been disclosed by FR 1 401 309 (see FIGS. 6 and 7). This arrangement is not designed to be capable of producing an automatic extension of the drive track in the final phase of tension wheel lowering. By virtue of its design construction the control arrangement for the tension wheel is bulky and can easily be exposed to damage from extraneous objects. The control cylinder for swivelling the tension wheel arm upwards and downwards in this arrangement is furthermore firmly affixed to the vehicle, in such a way that it is incapable of allowing rapid suspension movements of the tension wheel arm, when the tension wheel runs over a raised object on the ground, for example.

SE 0301046-9 (SE 525 073 C2) further discloses an arrangement for controlling a track tension wheel of a tracked vehicle, which has a telescopically length-adjustable tension wheel arm, which when lowered produces an automatic extension of the arm in order to simultaneously achieve a desired extension of the associated drive track running around the tension wheel. The tension wheel arm is controlled by two hydraulic cylinders pivotally mounted on the vehicle, which are situated outside the tension wheel arm. In order to permit suspension movements of the arm whilst driving on an uneven surface, one of the two cylinders may form a shock absorber in that the oil in the cylinder is allowed to flow through an associated restriction.

SE 0600274-5 (SE 529 600 C2) further discloses a track tension-adjusting arrangement of very compact construction, in which the hydraulic retracting and tensioning cylinders are protectively encapsulated in the actual tension wheel arm. This construction is relatively complicated, however, and costly to produce.

DISCLOSURE OF INVENTION

A primary object of the present invention is to propose a robust and compact arrangement of simple design for controlling a track tension wheel of a tracked vehicle, which will at the same time permit an improved control of the tension wheel in order to achieve modified running and emergency running characteristics on the ground surface and a substantially automatic stabilization of the track tension, irrespective of the actual height of the tension wheel relative to the ground surface, the tension wheel in moving between its upper and lower operating positions being made to move substantially vertically with a notional swivel axis situated far forward in the vehicle.

To this end the arrangement according to the invention described in the introductory part is characterized by the features specified in the characterizing part of the independent patent claim 1. The guide arm system according to the invention therefore comprises a first guide arm, which at an inner end thereof is swivel-mounted in the part fixed to the vehicle and which at an outer end, via a joint pin, pivotally supports a two-armed lever between a first end and a second end of the lever, a second guide arm, which at an inner end thereof is swivel-mounted in the part fixed to the vehicle and which at an outer end is pivotally connected to an outer end of a linearly displaceable part of the first drive element, and a third guide arm, which at its one end is pivotally connected to the outer end of the second guide arm and which at its other end is pivotally connected to the first end of the two-armed lever, the other end of the lever carrying the wheel axle journal, in addition to which an outer end of a linearly displaceable part of the second drive element is effectively connected to the two-armed lever carrying the wheel axle journal.

According to a suitable embodiment the first guide arm comprises two connected, parallel arm parts, between which the two-armed lever is supported on the joint pin, which advantageously affords support therein both for the two-armed lever and for the second guide arm.

In a preferred embodiment of the arrangement the outer end of the linearly displaceable part of the second drive element is pivotally connected to a self-supporting arm part, which is rigidly connected to and laterally offset in relation to the two-armed lever carrying the wheel axle journal, and which is pivoted on the joint pin. Among other things, this affords an advantageous placement of the two drive elements, laterally offset in relation to one another.

The first guide arm and the second guide arm are suitably supported on a common swivel axis in the part fixed to the vehicle, which gives a compact construction.

In order to keep the first guide arm biased towards a lowered position of the tension wheel, the first guide arm is effectively connected to a torsion spring at the inner end of the first guide arm. The torsion spring is then preferably embodied as a torsion bar, which extends substantially parallel to the swivel axis of the first guide arm. The biasing of the first guide arm by the torsion spring means that, in the event of any loss of pressure in the second drive element, the tension wheel will be made to swivel upwards around the joint pin, which supports the two-armed lever, due to the fact that the opposite end of the two-armed lever to that supporting the tension wheel is pivotally connected to the third guide arm held fast by the first drive element. Adequate track tension can thereby be maintained, in order to afford the requisite emergency running characteristics of the vehicle in terms of steering and braking.

The inner end of a linearly fixed part of the first and second drive elements, which preferably consist of double-acting hydraulic piston-cylinder units, is swivel-mounted in the part fixed to the vehicle.

The first hydraulic piston-cylinder unit is in any event hydraulically lockable, but with the tension wheel lowered can be rendered 'floating', so as to function as a hydraulic damper when driving over raised ground objects.

The invention will be described in more detail below with reference to drawings attached.

MODE(S) FOR CARRYING OUT THE INVENTION

Figure 1:
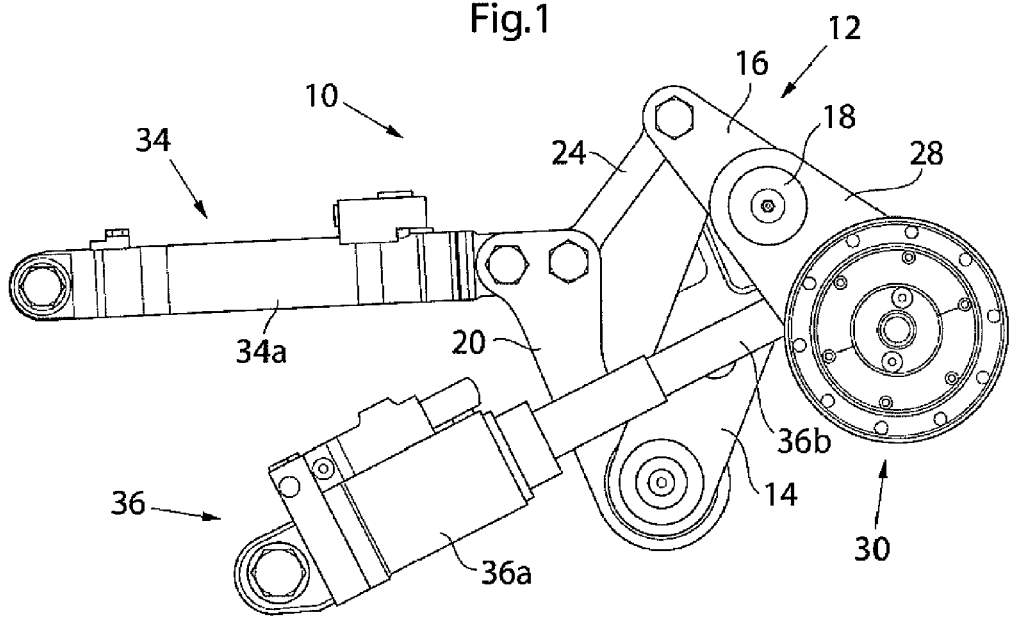
FIG. 1 is a side view of a preferred embodiment of a tension wheel control arrangement according to the invention for keeping a tension wheel (not shown) in a raised and retracted position.

In the figures of the drawing a tension wheel control arrangement according to the invention is denoted overall by 10. The arrangement 10 has a guide arm system 12, which comprises a first guide arm 14, which at an inner end is swivel-mounted in a part (not shown) fixed to the vehicle and which at its outer end pivotally supports a two-armed lever 16 on a joint pin 18. The guide arm system 12 further comprises a second guide arm 20, which is swivel-mounted in the part fixed to the vehicle, preferably about the same swivel axis as the first guide arm 14. As is shown in more detail, particularly in FIGS. 5-7, the first guide arm 14 is formed as two parallel arm parts 14a, 14b connected by a body 22, between which arm parts the two-armed lever 16 is supported on the joint pin 18 and in which the second guide arm 20 is supported between the inner parts of the two connected arm parts 14a, 14b of the first guide arm 14. At its one, inner end a third guide arm 24 of the guide arm system 12 is pivotally connected to the outer end of the second guide arm 20 and at its other, outer end is pivotally connected to the one end of the two-armed lever 16.

The other end of the two-armed lever 16 has a shaft 26, which is oriented parallel to the joint pin 18 and is rigidly connected to a self-supporting arm part 28, which is parallel to the lever 16 and is pivoted on the joint pin 18. A wheel axle journal 29 projects axially from the shaft 26 and is designed to carry a hub part 30 (FIGS. 1-4 and 8) for a tension wheel 32 shown in FIG. 7. In this embodiment the tension wheel 32 takes the form of a twin wheel.

For controlling the guide arm system 12 two hydraulic piston-cylinder units, an upper unit 34 and a lower unit 36, are preferably used. The upper piston-cylinder unit 34 has its cylinder part 34a pivotally fastened to the part (not shown) fixed to the vehicle and its piston rod part 34b pivotally fastened to the outer end of the second guide arm 20. The cylinder unit 34 (hereinafter referred to as the 'retracting cylinder') is used, with the aid of the first, second and third guide arms 14, 20 and 24 and the two-armed lever 16, to swivel the tension wheel 32 between a raised position and a lowered position.

Figure 2:
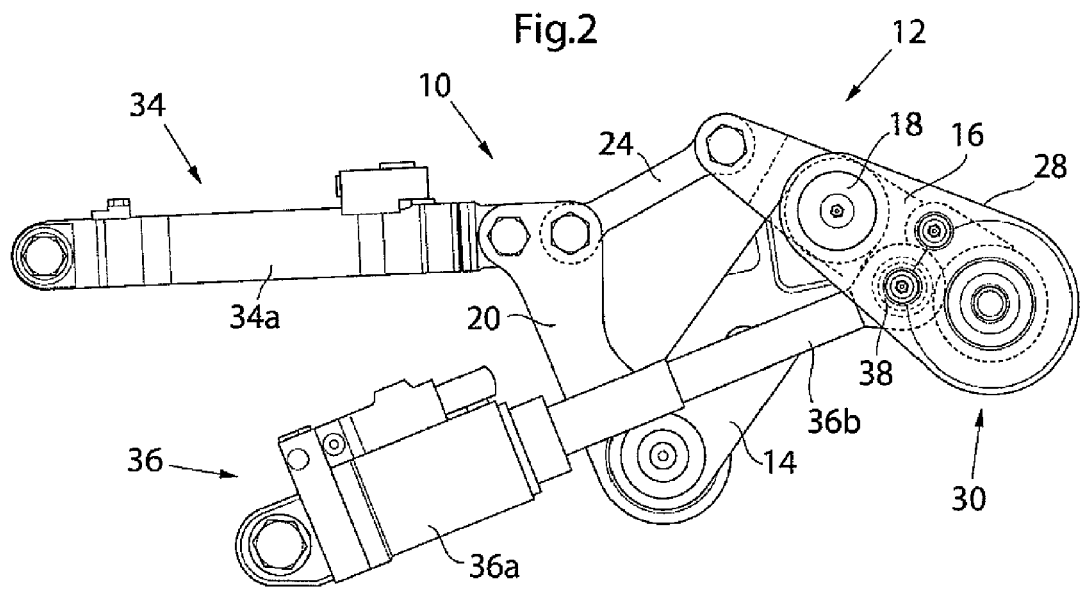
FIG. 2 is a side view of a preferred embodiment of the tension wheel control arrangement according to the invention, in which the tension wheel (not shown) is situated in a raised and projected position.
Figure 5:
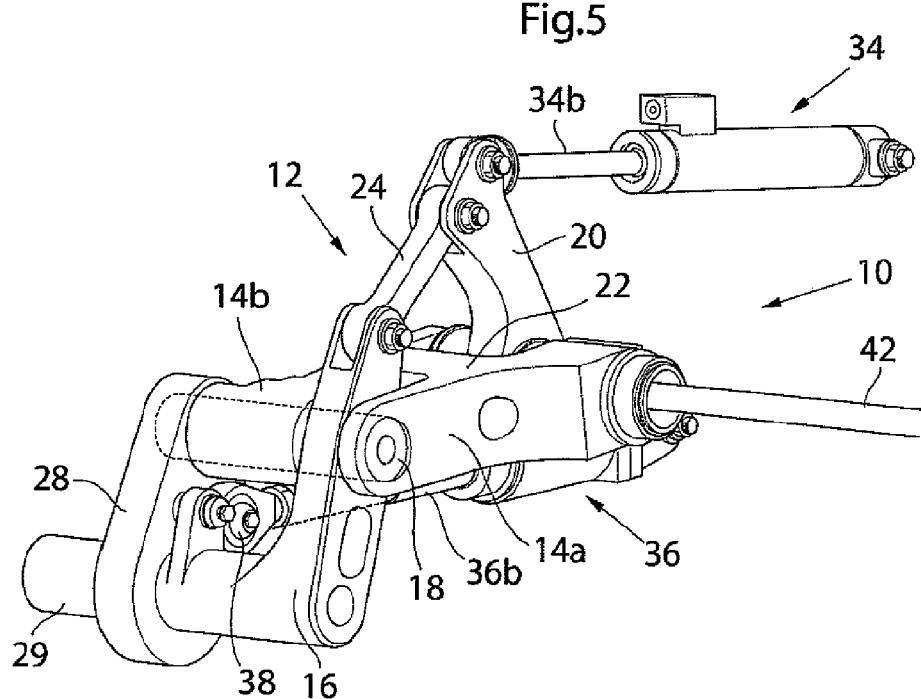
FIG. 5 is a perspective view from the inside of the tension wheel arrangement in a lowered and retracted position according to FIG. 3.
Figure 6:
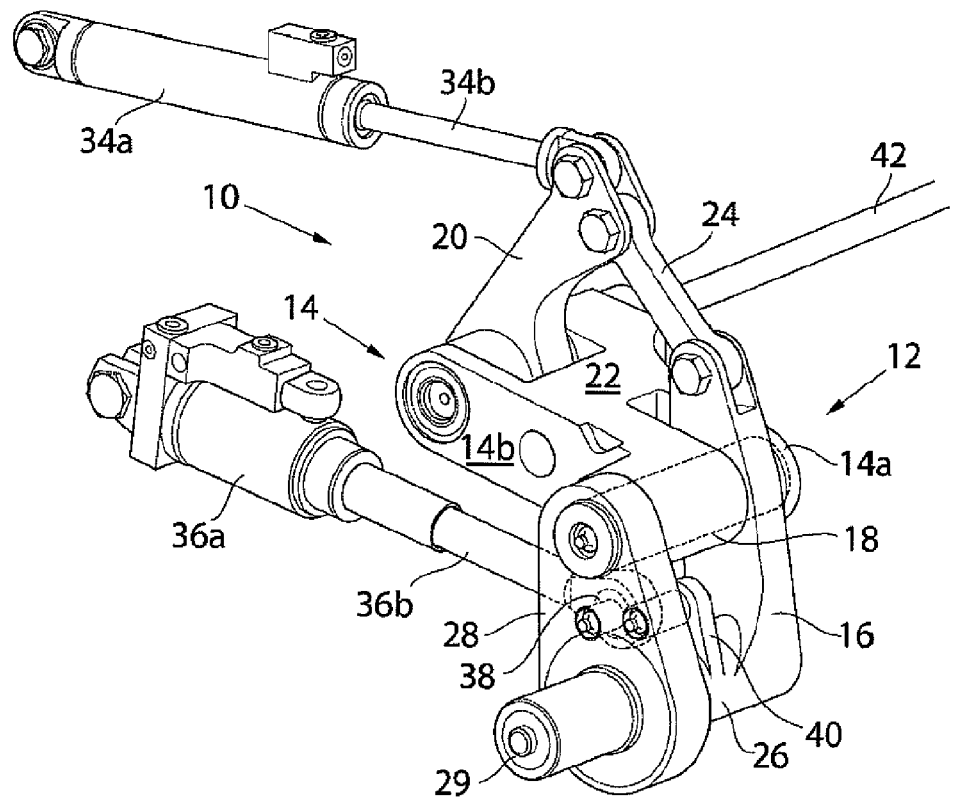
FIG. 6 is a perspective view obliquely from above the tension wheel arrangement in FIG. 5.

The lower piston-cylinder unit 36 also has its cylinder part 36a pivotally fastened to the part fixed to the vehicle, whilst its piston rod part 36b is preferably pivotally connected to the self-supporting arm part 28, which is rigidly connected to the two-armed lever 16, as can clearly be seen from FIGS. 2, 5 and 6. The piston rod part 36b is then fixed to a pin 38, which is carried by the arm part 28 and by a bracket 40 fixed to the shaft 26. The lower cylinder unit 36 (hereinafter referred to as the 'tensioning cylinder') is used for adjusting the tension in the associated drive track.

Figure 8:
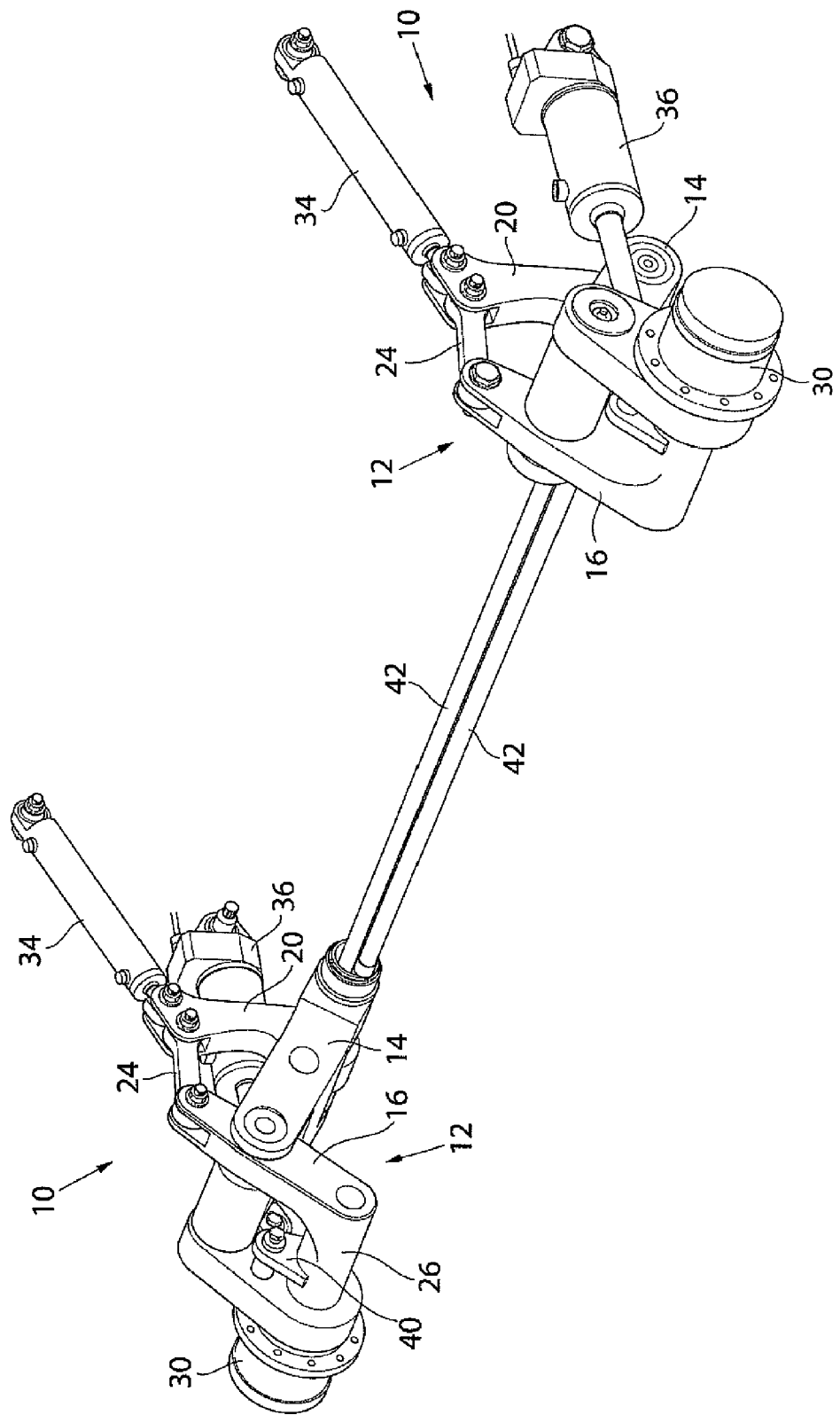
FIG. 8 shows a perspective view of a left-hand and a right-hand tension wheel arrangement for the rear end return of the drive track of a tracked vehicle.

As shown in FIG. 8, a left-hand and a right-hand tension wheel arrangement 10 which, of mirror-symmetrical design, are each arranged to support a tension wheel (not shown) for the rear end return of an associated left-hand or right-hand drive track of a tracked vehicle. The two arrangements 10 are coupled to one another by a pair of torsion bars 42, which are affixed so that they exert a tensioning torque on the first guide arms 14 in the direction of a lowered position, as shown in FIGS. 3-6.

Figure 7:
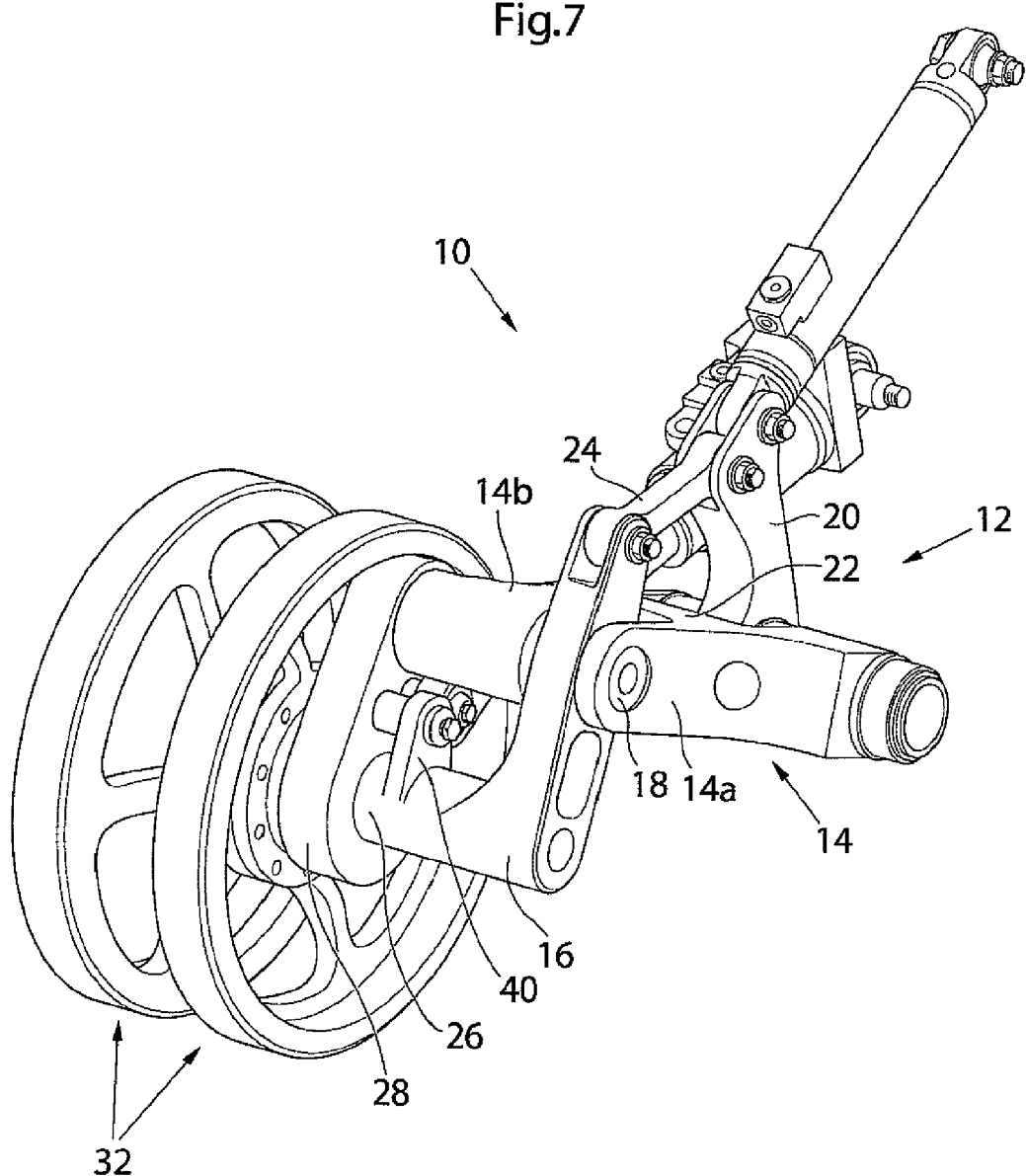
FIG. 7 is a perspective view of the tension wheel arrangement similar to FIG. 5 secured in a raised and retracted position and with a tension wheel in the form of a twin wheel.

FIGS. 1, 7 and 8 show the tension wheel arrangement 10 according to the invention in a state in which the retracting cylinder 34 has been contracted and raised the tension wheel and in which the tension cylinder 36 assumes a less than fully projected position for the tension wheel, whilst FIG. 2 shows a normal driving position, raised by the retracting cylinder 34 and projected by the tensioning cylinder 36, which stretches the associated drive track to a desired track tension once the piston rod 34b has been thrust out at maximum pressure and then reversed back by a predefined distance. During such running, the retracting cylinder 34 is kept hydraulically locked in its retracted position.

Figure 3:
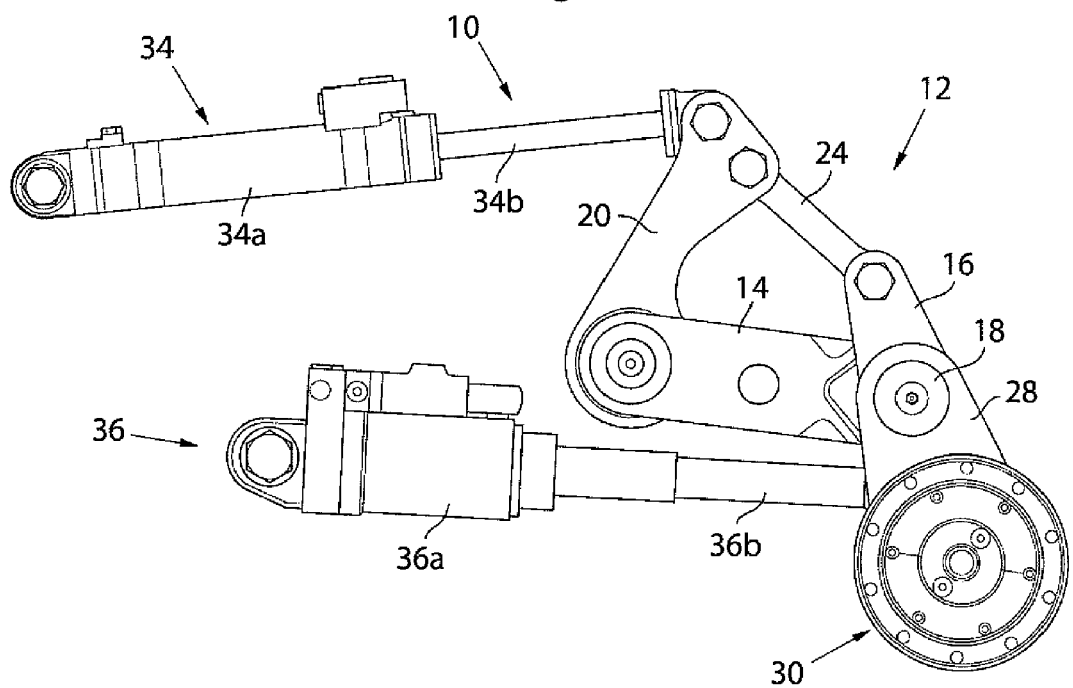
FIG. 3 is a side view of a preferred embodiment of the tension wheel arrangement according to the invention, in which the tension wheel (not shown) is situated in a lowered and retracted position.
Figure 4:
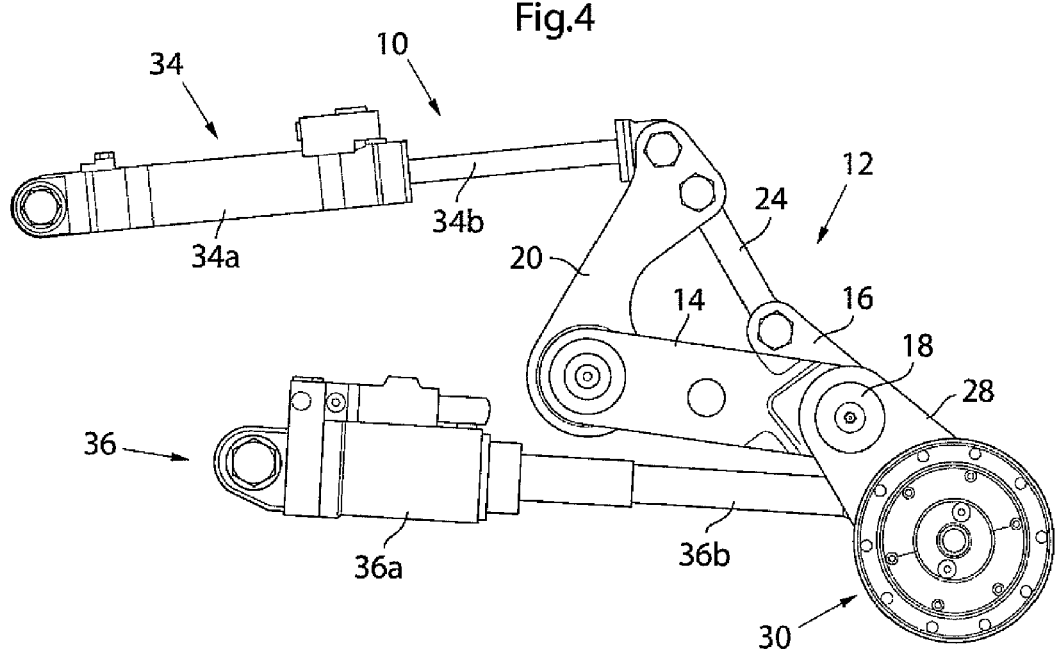
FIG. 4 is a side view of a preferred embodiment of the tension wheel arrangement according to the invention, in which the tension wheel (not shown) is situated in a lowered and projected position.

FIG. 3 shows the tension wheel arrangement 10 in a state in which the retracting cylinder 34 has been thrust out and lowered the tension wheel to a lower position for slower driving on a softer ground surface. In FIG. 4 the tension cylinder 36 has been thrust out somewhat so as to keep the associated drive track at the correct track tension in the lowered position. In this operating position the retracting cylinder 34 can be kept in an unlocked 'floating' position so as to allow compression of the tension wheel when driving over objects, the torsion bars 42 endeavouring throughout to press the tension wheel down towards the surface, so that it functions as an additional carrier wheel. The tension cylinder 36 may have an integral pressure-limiter, which is actuated if the track tension should become too great, for example when driving over raised objects.

Should the pressure in the tension cylinder 36 fail whilst the vehicle is in motion, when the retracting cylinder 34 is in the locked, retracted state, the downward bias exerted on the first guide arm 14 by the torsion springs 42 means that the tension wheel can still be swivelled upwards, because the opposite end of the two-armed lever 16 to that supporting the tension wheel is pivotally connected to the third guide arm 24 held fast by the retracting cylinder 34. Sufficient track tension can thereby be maintained to afford the vehicle the requisite emergency running characteristics in terms of steering and braking.

Even though in the embodiment described the hydraulic cylinders 34, 36 have been shown as drive elements for controlling the vertical and longitudinal position of the tension wheel relative to the vehicle, it is naturally possible, without departing from the scope of idea of the invention, to use other linear or rotating drive elements in order to achieve an equivalent control function. Pneumatic cylinders, ball screws, electric or hydraulic motors with racks and the like would be feasible, for example.

The invention claimed is:

1. Arrangement for controlling a track tension wheel of a tracked vehicle, comprising:
   a guide arm system, which at an inner part thereof is designed to be swivel-mounted in a part fixed to the vehicle and which on an outer part carries a wheel axle journal for rotatably supporting a hub of the track tension wheel, in such a way that this can be swivelled by means of a first drive element between a raised position and a lowered position, and
   a second drive element for varying the centre-to-centre distance between the centre axis of the track tension wheel and the swivel axis of the guide arm system in the part fixed to the vehicle, in order to bring about an adjustment of the tension in a drive track of the vehicle bearing against the tension wheel, or to allow changing of the drive track,
   wherein the guide arm system comprises
   a first guide arm, which at an inner end thereof is designed to be swivel-mounted in the part fixed to the vehicle and which at an outer end, via a joint pin (18), pivotally supports a two-armed lever between a first end and a second end of the lever,
   a second guide arm, which at an inner end thereof is designed to be swivel-mounted in the part fixed to the vehicle and which at an outer end is pivotally connected to an outer end of a linearly displaceable part of the first drive element, and
   a third guide arm, which at its one end is pivotally connected to the outer end of the second guide arm and which at its other end is pivotally connected to the first end of the two-armed lever, the other end of the lever carrying the wheel axle journal, in addition to which an outer end of a linearly displaceable part of the second drive element is effectively connected to the two-armed lever carrying the wheel axle journal.

2. Arrangement according to claim 1, wherein the first guide arm comprises two connected, parallel arm parts, between which the two-armed lever is supported on the joint pin.

3. Arrangement according to claim 2, wherein the outer end of the linearly displaceable part of the second drive element is pivotally connected to a self-supporting arm part, which is rigidly connected to and laterally offset in relation to the two-armed lever carrying the wheel axle journal, and which is pivoted on the joint pin.

4. Arrangement according to claim 1, wherein the first guide arm and the second guide arm are designed to be supported on a common swivel axis in the part fixed to the vehicle.

5. Arrangement according to claim 4, characterized in that the second guide arm is supported between the two connected arm parts of the first guide arm.

6. Arrangement according to claim 1, wherein the first guide arm is effectively connected to a torsion spring at the inner end of the first guide arm.

7. Arrangement according to claim 6, wherein the torsion spring is embodied as a torsion bar, running substantially parallel to the swivel axis of the first guide arm.

8. Arrangement according to claim 1, wherein the inner end of a linearly fixed part of the first and second drive elements, is designed to be pivotally mounted in the part fixed to the vehicle.

9. Arrangement according to claim 1, wherein the drive elements consist of double-acting hydraulic piston-cylinder units (34, 36).

10. Arrangement according to claim 9, wherein the two hydraulic piston-cylinder units are hydraulically lockable independently of one another.

11. Arrangement according to claim 2, wherein the first guide arm and the second guide arm are designed to be supported on a common swivel axis in the part fixed to the vehicle.

12. Arrangement according to claim 3, wherein the first guide arm and the second guide arm are designed to be supported on a common swivel axis in the part fixed to the vehicle.

13. Arrangement according to claim 2, wherein the first guide arm is effectively connected to a torsion spring at the inner end of the first guide arm.

14. Arrangement according to claim 3, wherein the first guide arm is effectively connected to a torsion spring at the inner end of the first guide arm.

15. Arrangement according to claim 4, wherein the first guide arm is effectively connected to a torsion spring at the inner end of the first guide arm.

16. Arrangement according to claim 5, wherein the first guide arm is effectively connected to a torsion spring at the inner end of the first guide arm.

* * * * *